United States Patent

Steffan

[11] Patent Number: 5,998,976
[45] Date of Patent: Dec. 7, 1999

[54] POWER SUPPLY SYSTEM

[75] Inventor: Bernhard Steffan, Ludwigsburg, Germany

[73] Assignee: Robert Bosch GmbH, Stuttgart, Germany

[21] Appl. No.: 09/091,802

[22] PCT Filed: Oct. 2, 1997

[86] PCT No.: PCT/DE97/02265

§ 371 Date: Jun. 22, 1998

§ 102(e) Date: Jun. 22, 1998

[87] PCT Pub. No.: WO98/21805

PCT Pub. Date: May 22, 1998

[30] Foreign Application Priority Data

Nov. 8, 1996 [DE] Germany ............................ 196 46 043

[51] Int. Cl.⁶ ................................ H02P 3/00; H02H 7/06; B60R 22/00; F02N 11/04
[52] U.S. Cl. ............................ 322/10; 322/29; 307/10.6; 290/31; 290/46
[58] Field of Search ..................... 322/10, 29; 290/30 R, 290/31, 32, 35, 46; 307/10.6

[56] References Cited

U.S. PATENT DOCUMENTS

| | | | |
|---|---|---|---|
| 4,883,973 | 11/1989 | Lakey et al. | 290/31 |
| 5,175,439 | 12/1992 | Harer et al. | 307/10.1 |
| 5,929,537 | 7/1999 | Glennon | 307/46 |

FOREIGN PATENT DOCUMENTS 37 43 317  12/1987  Germany.

Primary Examiner—Clayton LaBalle
Assistant Examiner—Peter Medley
Attorney, Agent, or Firm—Michael J. Striker

[57] ABSTRACT

An arrangement for voltage supply with an electrical machine that can be operated as a generator or as a starter is proposed, which is operated by the engine in the generator mode and which brings the engine to the requisite minimum rpm in the starting mode. The electrical machine is connected via a changer to a voltage converter that is connected to the battery of the on-board electrical system. In the starting mode, the voltage converter is bypassed by a switch element, so that the starter is supplied directly from the battery. In the generator mode, the switch element is opened, so that the generator can be operated with elevated voltage compared to the on-board electrical system voltage, and this elevated voltage is converted to the on-board electrical system voltage in the voltage converter.

7 Claims, 2 Drawing Sheets

POWER SUPPLY SYSTEM

The invention is based on an arrangement for voltage supply as generically defined by the preamble to the main claim. Such an arrangement includes an electrical machine which can be operated as a generator or as a starter and is drivable by an internal combustion engine and can be connected to a battery via an intermediate voltage circuit, which includes at least one voltage converter and at least one changer.

PRIOR ART

Generating electrical energy, especially for an on-board electrical system of a motor vehicle, is typically done with a rotary current generator, whose output voltage is regulated by a voltage regulator. As generators, electrical machines that also act as starters in the starting mode can be used. One arrangement for voltage supply in an on-board electrical system of a motor vehicle in which this kind of starter/generator is employed is known for instance from German Published, Non-Examined Patent Application DE-OS 37 43 317. Here the starter/generator is connected to the battery via an intermediate voltage circuit, which includes changers and voltage converters. The starter/generator is designed such that in the generator mode it generates a voltage that is substantially higher than the on-board electrical system voltage. The on-board electrical system voltage is generated from this substantially higher voltage by using a voltage converter. In the starter mode, the voltage converter generates the higher voltage for the starter from the on-board electrical system voltage of the battery.

ADVANTAGES OF THE INVENTION

The arrangement for voltage regulation according to the invention, having the characteristics of claim 1 has the advantage over the known embodiment that the voltage at the electrical machine that can be operated as a starter/generator is optimally adaptable to the needs prevailing in starting and to those prevailing during normal generator operation. These voltage requirements during starting and during normal operation are such that in starting, when the electrical machine is operated as a starter that is intended to bring the engine to a relatively low rpm (starting rpm), a low voltage suffices to generate a sufficiently high moment, while during normal operation at higher rpm, a higher voltage leads to a better voltage supply for the on-board electrical system. The fact that only a low voltage is needed during starting is especially advantageous, because precisely in starting a lesser power or voltage can be output by the battery.

This advantage is attained by bypassing the voltage converter during the starting phase and supplying the changer, which is connected to the starter/generator, with the lower on-board electrical system or battery voltage, while in the generator mode the voltage converter is activated and as a result the changer is operated with the high voltage.

Further advantages of the invention are attained by the provisions recited in the dependent claims. It is especially advantageous that in the starting mode and in normal operation the voltage can be adapted within certain limits to requirements; suitable triggering means for the changers or partial bypassing of the voltage converter make it possible to generate different voltages. Since in the generator mode, for the sake of good efficiency, high voltages are desired, it may be advantageous to design the generator such that it achieves voltages that are far higher than the voltage of the on-board electrical system. To allow maximum power in operation of the machine as a generator, up to the maximum rpm, it may be helpful, in the case of drives that have a field attenuation region, to vary the transition to field attenuation by lessening or reducing the bypassing of the converter.

It is not absolutely necessary to use a bidirectional voltage converter as the voltage converter, because voltage conversion in only one direction is needed during generator operation. The design of the system need not take extreme cold starting values into account, since the starting power does not necessarily have to be transmitted. If generator operation at an elevated voltage level becomes necessary, then the transmission losses can decrease significantly, but in that case the converter must assure the requisite potential separation.

As switches that are intended to bypass the voltage converter entirely or in part, a mechanical disconnecting switch can be used, since typically switching into be done only when there is no current. However, it is also possible for electronic components with good conducting-state properties to be used as the bypassing switches.

DRAWING

One exemplary embodiment of the drawing is shown in FIG. 1 and will be described in further detail below. In FIG. 2, the relationship between power and rpm in an electrical machine is plotted.

DESCRIPTION OF THE EXEMPLARY EMBODIMENT

Figure 1:
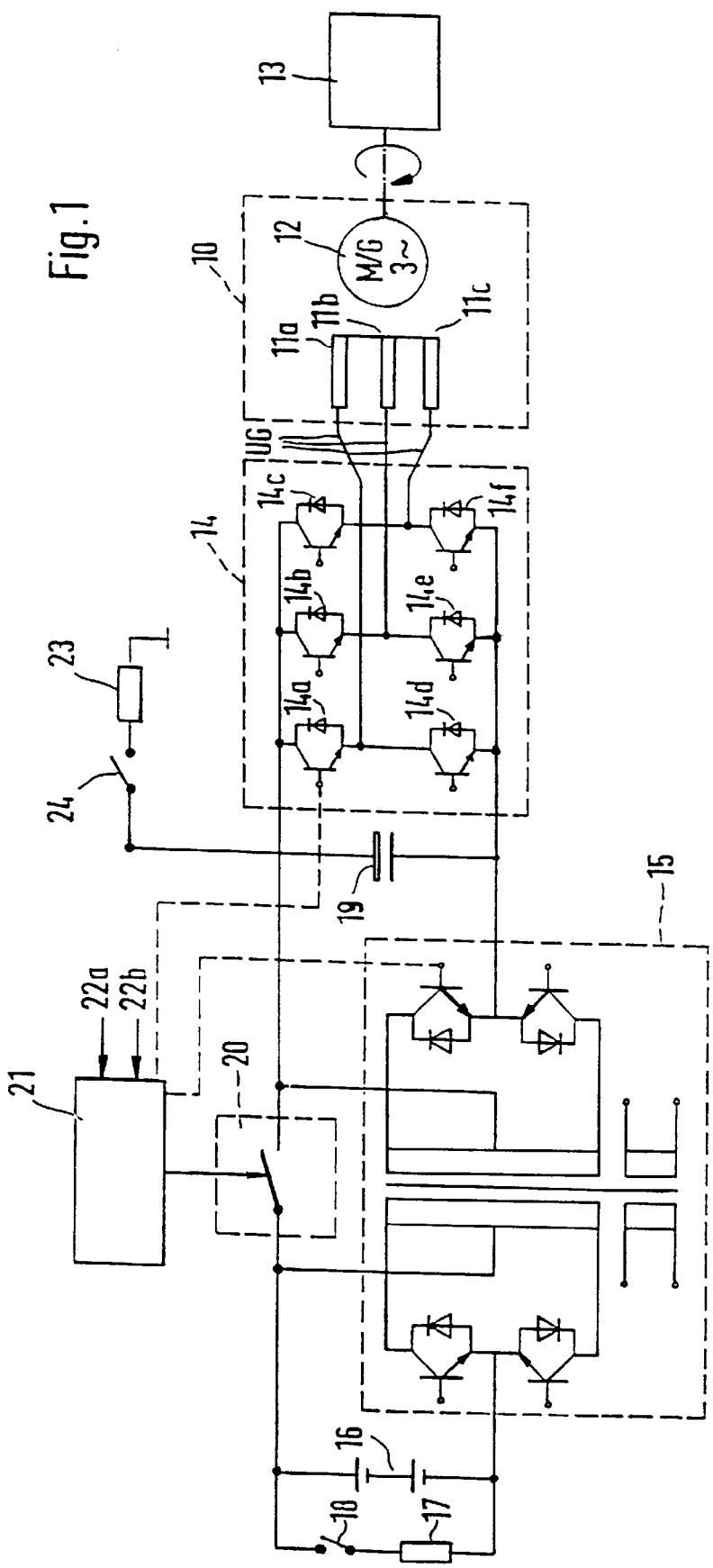

In FIG. 1, the components of an on-board electrical system for a motor vehicle that are required for understanding the invention are shown. Specifically, 10 is the electrical machine, which can be operated as a starter or as a generator and includes stator windings 11$a$, 11$b$, 11$c$, which for instance are connected as a delta circuit and which in the generator mode furnish an output voltage UG to each of the ends of windings that in the final analysis is used to supply the on-board electrical system of the vehicle. In the starter mode, a voltage that sets the rotor 12 of the starter/generator into rotation is applied to the ends of the windings. In the starter mode, the internal combustion engine, identified by reference numeral 13, is brought to the starting rpm by the starter/generator, with the requisite power being drawn from the battery 1$b$. In the generator mode, the engine 13 drives the starter/generator in the usual way.

The starter/generator 10 is connected to a pulse changing inverter 14 with a voltage converter 15 that is connected to the battery 16. The battery 16 is used to supply the electrical consumers of the on-board electrical system, which are identified by reference numeral 17 and can be turned on via a switch 18.

To stabilize the voltage, a capacitor 19 is located between the pulse changing inverter 14 and the voltage converter 15. Consumers 23 that are to be supplied with the higher voltage can be connected to the capacitor 19 via a switch 29. The voltage converter 15 can be bypassed with the aid of a switch element 20. The triggering of the switch element 20 is effected by means of a control device 21, which via inputs 22$a$, 22$b$ is supplied with information on the status of the engine and in particular information regarding a demand for starting. By way of example, the control device 21 may be the control unit of the engine 13, which also performs the open-and closed-loop control processes of the engine.

The interconnection of the pulse changing inverter 14 is for instance such that each of the stator windings 11$a$, 11$b$, 11c is connected between two pulse changing inverter elements 14a, 14d; 14b, 14e; 14c, 14f, and the other terminals of the pulse changing inverter elements are conductively connected to one another and lead to the capacitor 19. The pulse changing inverter elements 14a–14f are for instance transistors and associated free-running diodes; the transistors can be actuated by a regulating device 21.

The voltage converter 15 is shown in the exemplary embodiment in the form of a bidirectional converter. Both the transformer and the trigger transistors, including the associated free-running diodes, are merely shown schematically; they are triggered by the control device 21 or by their own control devices, not shown.

Both the pulse changing inverter 14 and the voltage converter 15 may be constructed in a different way. What is essential is that the switching means 20 assure bypassing of the voltage converter 15 under predeterminable conditions, such as during starting.

Figure 2:
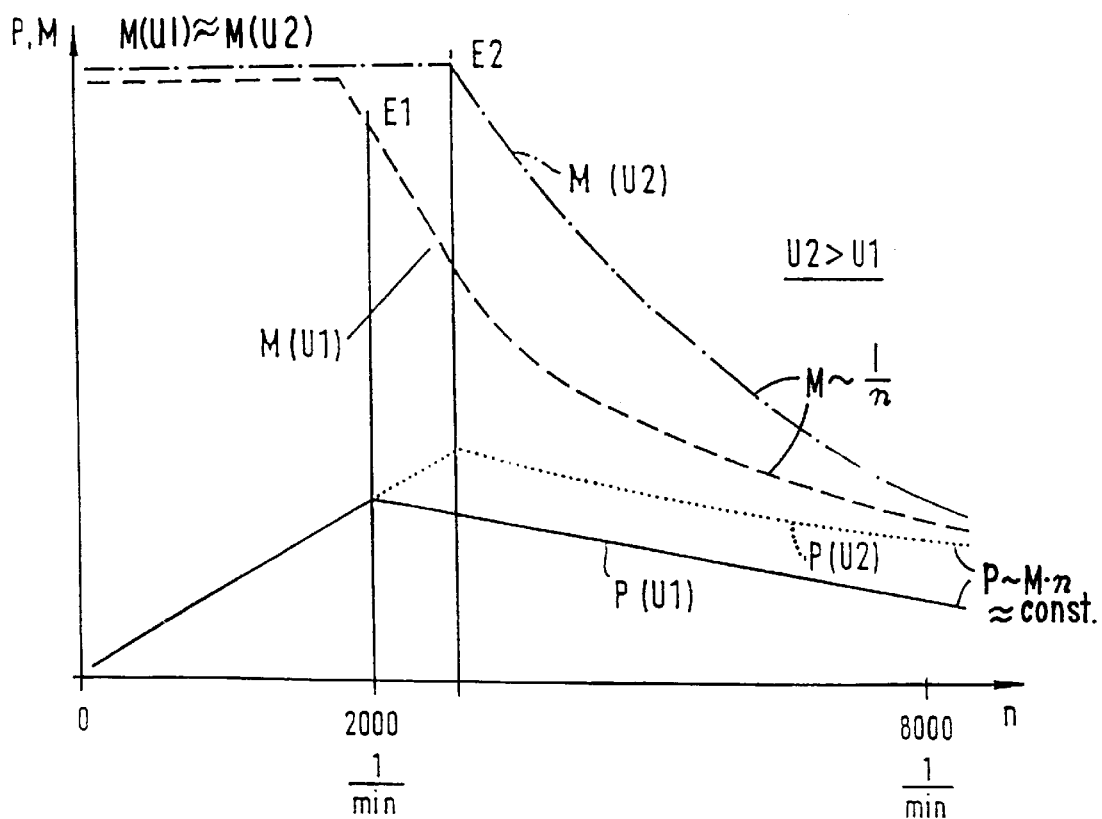

With the circuit arrangement shown in the drawing, the goal is to improve starting in a starter/generator system with an intermediate voltage circuit, which can be used for instance in internal combustion engines in motor vehicles. The fundamental concept that is the point of departure for the arrangement according to the invention is defined by the following conditions: Starting internal combustion engines when ambient temperatures are dropping higher torque or more power because of then-increasing friction. This power must be brought to bear in the final analysis by the starter, which is supplied from the battery during engine starting. However, since at the same time the behavior of the available batteries is such that at low temperatures less power can be produced, problems arise in starting internal combustion engines at low temperatures. This problem area is generally referred to by the term cold-starting problems. FIG. 2 schematically shows the relationship between moment and rpm, or electrical power and rpm, for various voltages. In FIG. 2, moments M(U1), M(U2) and powers P(U1), P(U2) for two different voltages U1<U2 are plotted over the rpm n. In each case there is an increase up to the turning point E1, E2 at which the field attenuation begins. As the voltage increases, the turning points shift toward higher rpm values.

If to generate the electrical energy for the on-board electrical system of the vehicle an electrical machine is used that can operate as both a starter and a generator, then along with the cold starting problems already mentioned still another object arises, which is for both the starting operation and the generator operation to be carried out optimally. Since the starting mode and the generator mode proceed at different rpm values, a regulating strategy that takes these different rpm values into account is proposed.

Optimal operation of a starter/generator requires that at low rpm, that is, during starting, it requires a low terminal voltage, which is formed via the changer 14 by pulse width modulation from the voltage applied to the intermediate voltage circuit. This voltage is stabilized by the capacitor 19 of the intermediate voltage circuit. If in the starting mode the reversing switch 20 is closed, then the capacitor 19 is connected directly to the battery, and the voltage at the capacitor 19 is equivalent to the voltage of the battery or on-board electrical system. When the reversing switch 20 is closed, the starter/generator can be operated at a voltage that is substantially equivalent to the battery voltage. The starter/generator acts as a motor and brings the engine to the required starting rpm values. The operation voltage of the starter, which is adapted via the changer, for instance by pulse width modulation, is in the final analysis a rotary voltage, whose maximum value is substantially proportion to the voltage of the on-board electrical system.

Once the starting process has ended, the starter/generator 10 is intended to function as a generator. It is then driven by the engine via the usual coupling and outputs an rpm-dependent output voltage. Since in the generator mode the highest possible output voltage is desired, the regulation of the generator is done such that the output voltage UG is higher than the voltage of the on-board electrical system. The output voltage UG is rectified with the aid of the pulse changing inverter elements 14 and is supplied to the voltage converter 15. In the generator mode, the reversing switch 20 is opened, so that the voltage UG, except for the part already out-coupled at the capacitor, is carried on through the voltage converter 15 and thus converted or reduced such that the voltage required to supply the battery 16, which is substantially the same as the on-board electrical system voltage or slightly higher, is furnished. The maximum power generated in the generator mode can be furnished up to the maximum rpm. A helpful aspect here, in systems with a field attenuation region, is to shift the transition to field attenuation to higher rpm values, by lessening the bypassing of the converter. The triggering of the reversing switch is done for instance with the aid of its own electronic device 21. This electronic device 21 may also be the engine control unit, to which information on selected engine operating parameters is supplied, and to which in particular the onset and end of the starting operation are indicated.

In the voltage converter, it is possible under some circumstances to dispense with bidirectionality, that is, the design need not take extreme cold starting values into account, since the starting power need not necessarily be transmitted via the voltage converter but instead can be transmitted via the bypassing means that are closed by the switch means 20. If the generator operation is to take place at a voltage level that is considerably higher than the conventional on-board electrical system voltage, then the transmission losses drop considerably. However, the voltage converter must then assure the prescribed potential separation, which in turn can lead to losses.

During the bypassing period, the battery power is made available as well as possible to the drive, or in other words the starter. The embodiment of the switch means 20 may be done in the form of a mechanical disconnecting switch that needs to be switched only when there is no current. Electronic components with good conducting-state properties are also suitable.

I claim:

1. An arrangement for voltage supply, having an electrical machine that can be operated as a generator or as a starter and is drivable by an internal combustion engine and can be connected to a battery via an intermediate voltage circuit, which includes at least one voltage converter and at least one changer, characterized in that in operation of the machine as a starter or in operation as a generator, below a predeterminable rpm the voltage converter (15) is bypassed by means of a switch element (20), and the changers (14) are connected directly to the battery 16.

2. The arrangement for voltage supply of claim 1, characterized in that the intermediate voltage circuit includes at least one capacitor (19), which is associated with the changer (14) or is a component of the changer (14).

3. The arrangement of claim 1, characterized in that the voltage converter is a bidirectional voltage converter, one side of which is connected substantially to the on-board electrical system voltage UB and the other side of which is connected to a higher voltage than the on-board electrical system voltage.

4. The arrangement of claim 1, characterized in that the switch element (20) is designed as a mechanical disconnection switch or as an electronic component that has only slight resistance in the conductive state.

5. The arrangement of claim 1, characterized in that a control device (21) is provided, which processes information supplied to it, in particular information regarding the presence of a demand to start or to end the starting operation, and which as a function of at least one of these items of information trips a triggering to actuate the switch element (20).

6. The arrangement of claim 1, characterized in that the pulse changing inverter (14) includes six pulse changing inverter elements, each with one transistor and one free-running diode that are operated in a pulse-width modulation mode, and which converts the direct voltage applied to the capacitor (19) into three alternating voltages shifted by 120° from one another, which are supplied to the stator windings (11a, 11b, 11c).

7. The arrangement of claim 1, characterized in that consumers are connected to the capacitor 19, and they can be supplied at least intermittently with a voltage that is higher than the on-board electrical system voltage.

* * * * *